United States Patent
Rhodes

(10) Patent No.: US 7,706,417 B1
(45) Date of Patent: Apr. 27, 2010

(54) METHOD OF AND CIRCUIT FOR GENERATING A PLURALITY OF DATA STREAMS

(75) Inventor: Martin B. Rhodes, Edinburgh (GB)

(73) Assignee: XILINX, Inc., San Jose, CA (US)

( * ) Notice: Subject to any disclaimer, the term of this patent is extended or adjusted under 35 U.S.C. 154(b) by 795 days.

(21) Appl. No.: 11/258,684

(22) Filed: Oct. 25, 2005

(51) Int. Cl.
*H04J 3/02* (2006.01)

(52) U.S. Cl. .................. 370/535; 370/537; 370/542

(58) Field of Classification Search .......... 370/535–545
See application file for complete search history.

(56) References Cited

U.S. PATENT DOCUMENTS

| | | | | |
|---|---|---|---|---|
| 4,542,504 | A * | 9/1985 | Moul et al. | 370/540 |
| 4,935,920 | A * | 6/1990 | Taniguchi et al. | 370/537 |
| 6,349,101 | B1 * | 2/2002 | Yamashita | 370/412 |
| 6,680,954 | B1 * | 1/2004 | Cam et al. | 370/474 |
| 6,724,810 | B1 | 4/2004 | Chapman | |
| 2003/0214979 | A1 * | 11/2003 | Kang et al. | 370/535 |
| 2004/0028087 | A1 * | 2/2004 | Yin et al. | 370/537 |
| 2004/0165619 | A1 * | 8/2004 | Larson | 370/535 |

OTHER PUBLICATIONS

Xilinx, Inc.; XAPP465; "Using Look-Up Tables as Shift Registers (SRL 16) in Spartan-3 Generation FPGAs"; (v1.1), May 20, 2005; available from Xilinx, Inc., 2100 Logic Drive, San Jose, California 95124; pp. 1-17.

Chapman, Ken, Xtreme DSP Techniques, Module 5, "Selective Filters", Version 2.0f, Training Course, Presentation, Apr. 2001, pp. 31-33, Xilinx, Inc. 2100 Logic Drive, San Jose, CA 95124.

IEEE Standard 802.3, 1998 Edition, "Information technology-Telecommunications and information exchange between systems-Local and metropolitan area networks-Specific requirements-Part 3: Carrier Sense Multiple Access with Collision Detection (CSMA/CS) access method and physical layer specifications", Computer Society, Sep. 28, 1998, 1262 pages.

* cited by examiner

*Primary Examiner*—Ricky Ngo
*Assistant Examiner*—Pao Sinkantarakorn
(74) *Attorney, Agent, or Firm*—John J. King

(57) ABSTRACT

A method of generating a plurality of data streams using a data protocol is disclosed. The method comprises steps of receiving an input data stream comprising a periodic sequence of data words, wherein each the data word of the input data stream is associated with a data stream of a plurality of data streams. The data words of the input data stream are sequentially processed by a data control circuit. Finally, data output by the data control circuit is demultiplexed to generate a plurality of output data streams. A circuit for generating a plurality of data streams using a data protocol is also disclosed.

20 Claims, 6 Drawing Sheets

METHOD OF AND CIRCUIT FOR GENERATING A PLURALITY OF DATA STREAMS

FIELD OF THE INVENTION

The present application is related to data communication, and in particular, to a method of and circuit for generating a plurality of data streams.

BACKGROUND OF THE INVENTION

Data communication is a critical function of many electronic devices, and integrated circuits are typically an integral part of a data transmission scheme. Data is typically transmitted at a variety of levels, such as between elements of an integrated circuit, between integrated circuits on a circuit board, between circuit boards, or between systems, which could be local or remote. Data can also be transmitted as a serial data stream or in parallel data streams. Transferring data by way of a serial data stream makes efficient use of the available resources, such as the number of input/output pins used to transfer data. However, the transmission of data in any data transmission scheme must not only be reliable, but must also be usable when received at a destination.

Accordingly, data is often transferred according to predefined protocols. For example, the Medium Access Control (MAC) protocol defined by the I.E.E.E. 802.03 standard establishes the data link layer for the telecommunications and information exchange between local and metropolitan area networks. The I.E.E.E. 802.03 MAC protocol could be used to provide the data link layer of an Ethernet LAN system, for example. The relationship of the data link layer to other layers of the I.E.E.E. 802.03 standard is shown in FIG. 1. The MAC protocol generally encapsulates payload data by adding a header (Protocol Control Information (PCI)) before the data and appending a Cyclic Redundancy Check (CRC) after the data. The entire frame is preceded by a small idle period and a preamble. However, the circuitry required to implement various data transfer protocols is typically different. Even within a given protocol, data could be transferred at different rates, and could require different circuitry.

While various types of integrated circuits provide different levels of flexibility in implementing circuits, one class of integrated circuits which provides particular flexibility in implementing circuits is a programmable logic device (PLD), such as a field programmable gate array (FPGA). While a programmable logic device provides a number of programmable functions, as will be described in more detail in reference to FIG. 11, a programmable logic device could also provide other features which are provided in fixed hardware, and therefore are non-programmable. For example, the programmable logic device could include one or more data transceivers, such as multi-gigabyte data transceivers. Although the programmable logic portions provide flexibility to the user, the user may be restricted by a fixed portion of a programmable logic device. For example, a programmable logic device having a high speed data transceiver is limited to a data protocol for that transceiver to transmit the data. That is, the user may be required to transmit only a single stream of data at a given data rate.

Further, the needs of a user for transmitting data in an integrated circuit may vary. A user may need to transmit data at multiple data rates. For example, it is very common that numerous Ethernet MAC cores are required for debugging and communicating with embedded processors; implementing an Ethernet switcher/router application; providing chip to chip or backplane interfaces, etc. However, in order to transmit the various data streams at different data rates, multiple data transceivers would be required. As shown for example in FIG. 2, each of a plurality of data streams 202 would have a data control circuit 204 which receives data from a FIFO 206 and outputs the data to a FIFO 208 and a media independent interface (MII) 210, as is well known in the art. Each data control circuit would require a data link layer according to a protocol, such as a MAC protocol defined by I.E.E.E. 802.03. That is, the data link layer provided according to the MAC protocol would have to be duplicated, in programmable logic of a programmable logic device, for example, for each of the data streams received by the data transceivers or by general I/O ports.

While circuit designers are always working to reduce the area occupied by circuits of a given design to either reduce the size of the integrated circuit or increase the circuit capacity of a given integrated circuit, implementing multiple data link layers requires considerable space on the integrated circuit, as well as increases the noise on the integrated circuit. Also, a given integrated circuit may have a data link layer which has a certain data rate and an overall throughput. That is, an integrated circuit may implement a high speed data protocol which has the capacity to transmit a certain amount of data at a high rate, but would be unable to transfer the same amount of data as a plurality of data streams at a lower data rate to achieve the same overall throughput. For example, a conventional 1 Gigabits per second (Gbps) MAC core would not be able to transmit 10 streams of data at 100 Megabits per second (Mbps).

Accordingly, there is a need for a method of and circuit for generating a plurality of serial data streams employing a single data control circuit.

SUMMARY OF THE INVENTION

A method of generating a plurality of data streams using a data protocol is disclosed. The method comprises steps of receiving an input data stream comprising a periodic sequence of data words, wherein each the data word of the input data stream is associated with a data stream of the plurality of data streams. The data words of the input data stream are sequentially processed by a data control circuit, wherein said data control comprises combinatorial logic for implementing said data protocol for each said data stream of said plurality of data streams; and data output by the data control circuit is demultiplexed to generate a plurality of output data streams. Finally, the output data streams could be output at a second data rate which is less than the data rate for receiving an input data stream.

A circuit for generating a plurality of data streams using a data protocol is also disclosed. The circuit comprises an input coupled to receive an input data stream comprising sequences of data words, wherein each the data word of the input data stream is associated with a data stream of the plurality of data streams. A data control circuit comprising a queuing element is coupled to the input, wherein the data control circuit implements the data protocol for each of the data streams. Finally, a demultiplexer is coupled to the data control circuit, wherein the demultiplexer outputs a plurality of output data streams at a second data rate. Specific embodiments of implementing the circuit elements in a configurable logic block of a programmable logic device are also disclosed.

DETAILED DESCRIPTION OF THE DRAWINGS

Figure 1:
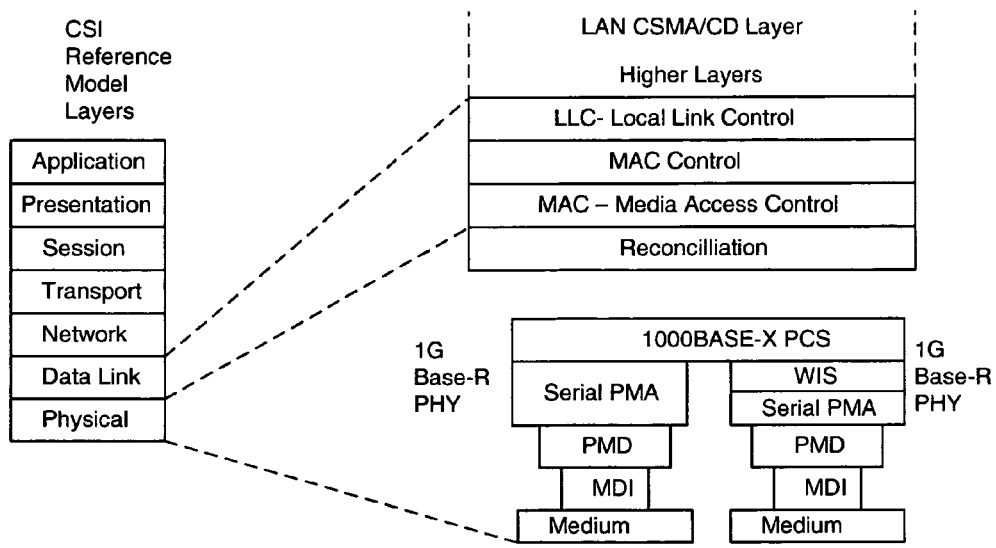
FIG. 1 is a diagram of a conventional data protocol for transferring data.
Figure 2:
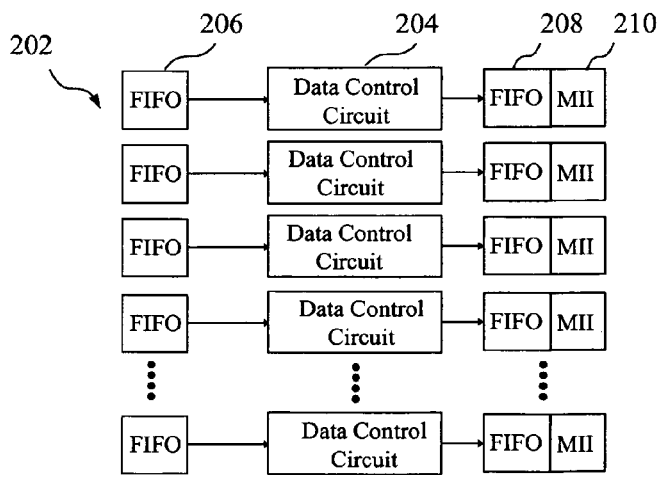
FIG. 2 is a block diagram of a conventional circuit for transferring a plurality of data streams.
Figure 3:
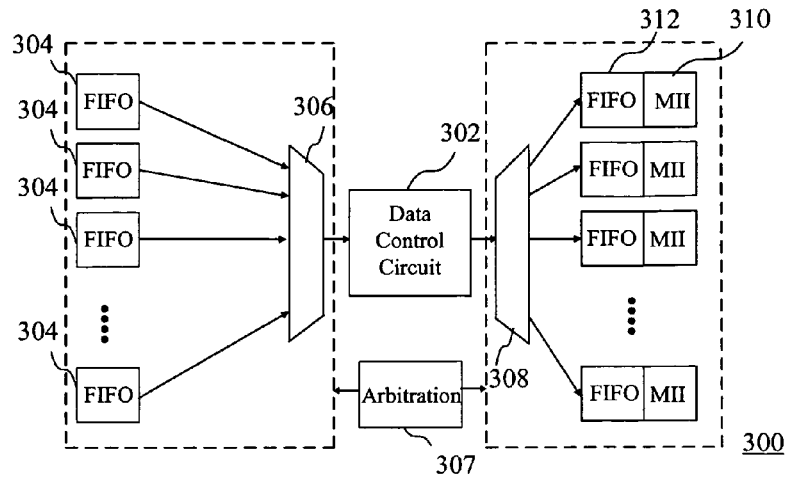
FIG. 3 is a block diagram of a circuit for transmitting data according to an embodiment of the present invention.
Figure 4:
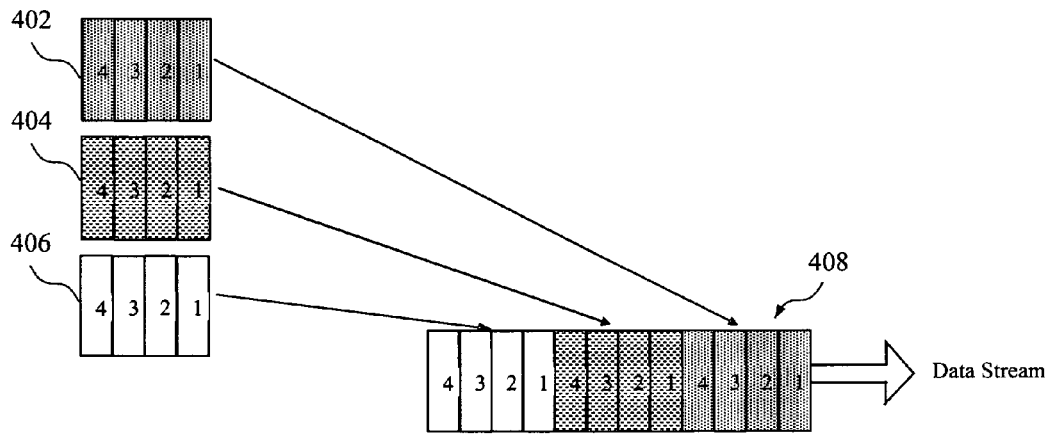
FIG. 4 is a diagram showing the multiplexing of data frames according to the embodiment of FIG. 3.

Turning first to FIG. 3, a block diagram of a circuit 300 for transmitting data according to an embodiment of the present invention is shown. In particular, a data control circuit 302 is coupled to a plurality of FIFOs 304 for receiving a plurality of data streams by way of a multiplexer 306. The data control circuit could generally enable a data link layer of a data transmission protocol, for example. The data control circuit 302 is adapted to receive multiplexed frames of data input to the multiplexer 306. The multiplexing of data frames according to the embodiment of FIG. 3 is shown in FIG. 4. Each data stream 402-406 of a plurality of data streams comprises a frame having a plurality of words 1-4. The words 1-4 could be any number of bits (e.g. 1 bit, 8 bits, 32 bits, etc.). As can be seen, the individual frames are multiplexed to generate a data stream 408. That is, entire frames are multiplexed through a data control circuit, such as a MAC core of a data transceiver, in turn from separate data channels. Accordingly, the FIFOs 304 are required to store the queued frames for each channel. Further, an arbitration circuit 307 is required to select a channel in turn, and must attempt to fully utilize the maximum throughput of all channels, while ensuring that FIFO overflow does not occur on any channel.

Logic is also coupled to the physical-side interface of the data control circuit so that frames are demultiplexed by a demultiplexer 308 to their original channels, and transmitted out separately on individual MII interfaces 310. This logic may require small holding FIFOs 312 for clock conversion. Accordingly, the output demultiplexer 308 is coupled to receive the data stream output by the data control circuit 302, and generate a plurality of data streams, the output of which is also controlled by the arbitration circuit 307. While the circuit of FIG. 3 provides improvement over using multiple data control circuits, such as separate MAC cores for a plurality of data transceivers, it is still possible to further reduce the circuit requirements by modifying the data control circuit associated with a conventional data transceiver, as will be described in detail in reference to FIGS. 5-8.

Figure 5:
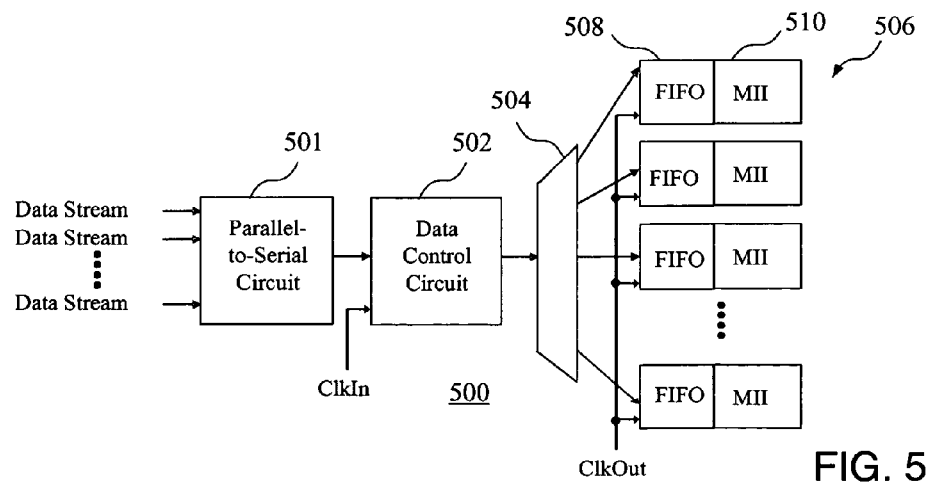
FIG. 5 is a block diagram of a circuit for transmitting data according to an alternate embodiment of the present invention.
Figure 6:
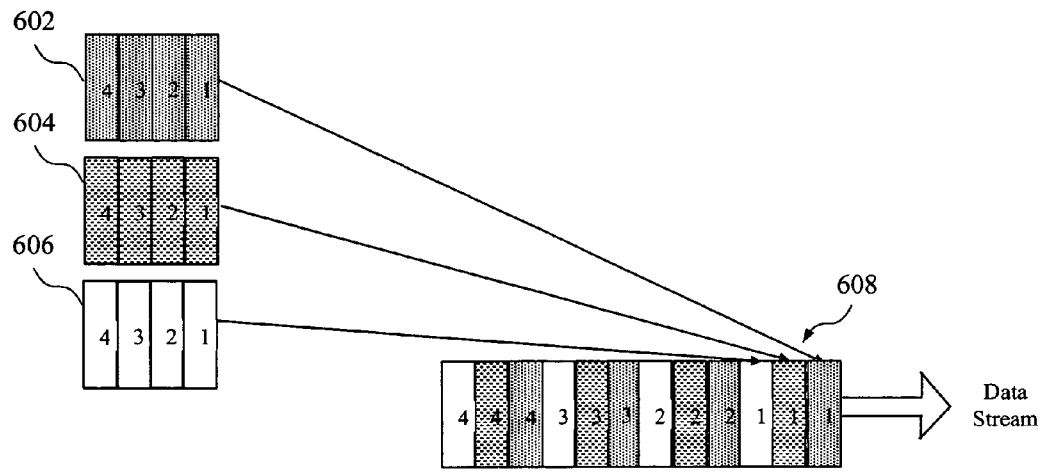
FIG. 6 is a diagram showing the multiplexing of data words according to the embodiment of FIG. 5.

Turning now to FIG. 5, a block diagram of a circuit 500 for transmitting data according to an alternate embodiment of the present invention is shown. A plurality of data streams is coupled to a parallel-to-serial circuit 501. The parallel-to-serial circuit 501 receives the input data streams and generates a word multiplexed data stream which is coupled to a modified data control circuit 502 which is clocked using a first high speed clock (ClkIn). The word multiplexed data stream could be generated as shown in FIG. 6. Because the data stream comprises word multiplexed data, it is not necessary to buffer the complete frames and multiplex the individual words of the data streams, which would require more complex circuitry. Accordingly, the circuit of FIG. 5 not only reduces the complexity of routing the multiplexed signals, but also reduces the circuit elements requirements to enable the parallel-to-serial conversion. The output of the data control circuit 502 is demultiplexed by a demultiplexer 504, and is coupled to the individual output data channels 506 using a second lower speed clock (ClkOut). The output data channel 506 could comprises FIFOs 508 and media independent interfaces (MII) 510.

Figure 7:
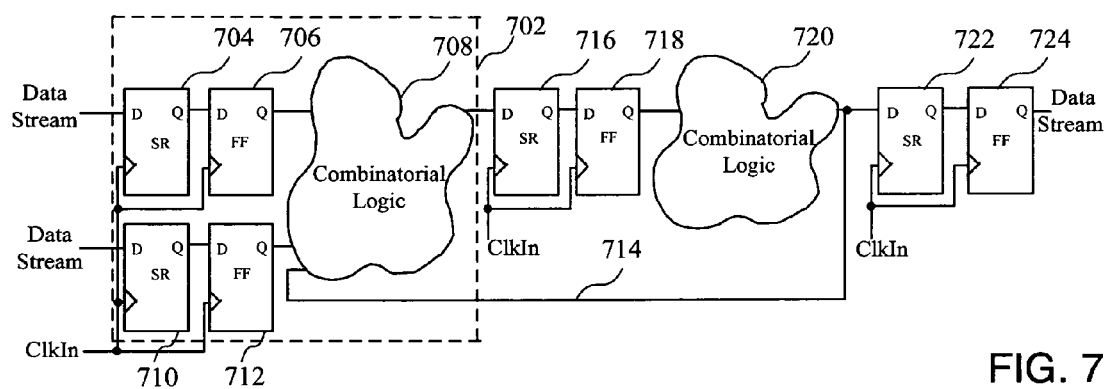
FIG. 7 is a block diagram of a modified data control circuit for enabling the transfer of data according to the embodiments of FIGS. 5 and 6.

Turning now to FIG. 7, a block diagram of a modified data control circuit for enabling the transfer of data according to the embodiments of FIGS. 5 and 6 is shown. The modified data control circuit comprises one or more logic circuits 702 comprising a synchronous element having a shift register 704 coupled to receive input data (or data from another logic circuit 702) and a register 706, and combinatorial logic 708. The combinatorial logic could also receive the data stream at a second input by way of another serial combination of a shift register 710 and a flip flop 712, as well as data by way of a feedback path 714 output from downstream combinatorial logic. In particular, the output of combinatorial logic 708 is coupled to another serial combination of a synchronous element comprising a shift register 716 and a flip flop 718 and combinatorial logic 720. In addition to being fed back to an input of combinatorial logic 708 by way of feedback path 714, the output of combinatorial logic 720 is also coupled to a shift register 722 and a register 724. Both the shift register 704 and the register 706 preferably share a common clock source ClkIn, which is a high speed clock source for receiving data. As will be described in more detail below, the individual words will be output at a second lower clock speed. The shift registers and flip flops also have an appropriate depth for accommodating the word length of the words generated by the data stream output of FIG. 6. For example, the registers of the shift register and the flip flops would be eight bits deep for processing eight bit words and couple eight outputs to the combinatorial logic. Although a shift register is shown to accommodate the words of the data stream which is word multiplexed, other queuing elements known in the art could be used such as a first-in first-out (FIFO) element. Unlike a conventional data control circuit, such as a conventional MAC core which would simply have a register, the logic circuit 702 further comprises a queuing element such as a shift register 704 for enabling the processing of a word multiplexed data stream, as will be described in more detail below. While any number of logic circuits 702 could be employed, each shift register in any cascaded logic circuits is set to the same delay, and the data input to the combinatorial logic is processed by the combinatorial logic within a single clock cycle. Similarly, the combinatorial logic necessary to implement a data transfer protocol could vary between data protocols, and any appropriate combinatorial logic circuit could be used. The function of the shift register will now be described in more detail in reference to FIG. 8.

Figure 8:
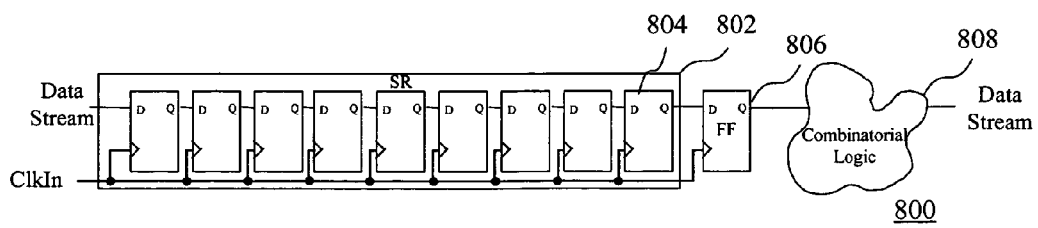
FIG. 8 is a block diagram of a logic circuit for enabling the transfer of data according to an embodiment of the present invention.

Turning now to FIG. 8, a block diagram of a logic circuit 702 for enabling the transfer of data according to an embodiment of the present invention is shown. In particular, a shift register 802 comprises a plurality of registers 804 depending upon the number of data streams which are word multiplexed into a single word multiplexed data stream. Although a combination of a shift register coupled to a register is shown, a single shift register having a number of registers equal to the number of data streams could also be used in place of the combination of a shift register and a register. An example of a shift register architecture which could be used is an SLR16 described in Xilinx Application Note XAPP465 (V1.1) May 20, 2005, entitled "Using Look-Up Tables as Shift Registers (SLR16) in Spartan-3 Generation FPGAs," the entire document of which is incorporated by reference. In an FPGA implementation having a 1-Gigabit Ethernet MAC core, for example, the combinatorial logic implemented in FPGA lookup tables (LUTs) are interspersed with synchronous elements (i.e. the shift register 802 and register 806) implemented in the FPGA flip-flops. According to one aspect of the logic circuit of FIG. 8, the combinatorial logic 808 remains unchanged, while the synchronous elements are modified. Therefore, the functionality of the combinatorial logic is provided for multiple data streams without any duplication of logic. Only modifications to the synchronous elements are required, which significantly reduces the additional logic elements when compared to a circuit which duplicates an entire data link layer for each data stream.

By way of example, if the delay of the shift registers of all of the logic circuits 702 is set to a delay of 9, an overall delay of 10 clock cycles would result in the synchronous element. Accordingly, if it is possible to overclock the data control circuit by a multiple of 10, 10 individual channels could be multiplexed through the common data control circuit. That is, the synchronous elements present the current stored state of an individual channel (across the entire design) to the input of the combinatorial functions every tenth clock cycle. The output states of the combinatorial functions are then stored in the following shift register on the subsequent clock cycle, while the current stored state of the next channel in the sequence is then presented by the synchronous elements to the combinatorial logic. In this way, data word multiplexing is achieved through the data control circuit, where a data word of a single channel is processed by the logic design of the common data control circuit every ten clock cycles. This example could directly apply to the 1-Gigabit Ethernet MAC core, which performs 1 Gbps operations at a core clock frequency of 125 MHz. Because a 100 Mbps Ethernet MAC is 1/10 of this rate, 10 individual 100 Mbps Ethernet channels can be multiplexed though this single common core, where each channel is effectively operating at a frequency of 12.5 MHz.

While the logic circuit 702 of FIG. 7 is generally larger than a conventional circuit because it uses an extra shift register requiring a lookup table for every register of a conventional circuit, the circuit significantly reduces the overall circuitry required to implement 10 serial data transceivers. Further, the logic circuit 702 is flexible. If 125 MHz timing cannot be achieved in a given device, it is possible to drop to 8 channels and clock the data control circuit at 100 MHz. In contrast, if the 125 MHz timing is easily achieved in another circuit, the number of channels could be increased to 12 channels where the data control circuit is clocked at 150 MHz. By implementing the data control circuit in programmable logic, such changes to the number of channels and frequency are possible.

According to one embodiment of the invention, the combinatorial logic and sequential logic could have separate descriptions, giving the sequential logic a separate level of hierarchy. Accordingly, it is possible to change the behavior of the sequential logic independently (i.e. without changing the combinatorial component). That is, it is possible to change the sequential circuit to a cascaded shift register and flip-flop throughout the entire design by changing one portion of the code implementing the circuit.

Turning now to FIG. 9, a sequence of circuits shows the transfer of data according to an embodiment of the present invention. The logic circuit 702 of FIG. 9 comprises the shift register 704, having two stages 902 and 904, and the register 706 coupled to combinatorial logic 708. Accordingly, the logic circuit 702 comprises a total of three registers for each input to the combinatorial logic, and can therefore output a word multiplexed data stream comprising words from three data streams. The combinatorial logic could also receive data from a second path comprising the serial combination of the shift register 710 having registers 906 and 908 and the register 712, as well as data from downstream combinatorial logic by way of feedback path 714. The combinatorial logic is shown by way of example as having an AND gate 910 coupled to receive and the output $Q_1$ of register 706, and the output of a second AND gate 912 coupled to receive the output $Q_1$ of the register 712 and the data on feedback path 714. The output of the logic circuit 702 is coupled to the shift register 716 of the next stage of the data control circuit. The shift register 716 also comprises two registers 914 and 916, and is coupled to the register 718.

Figure 9A:
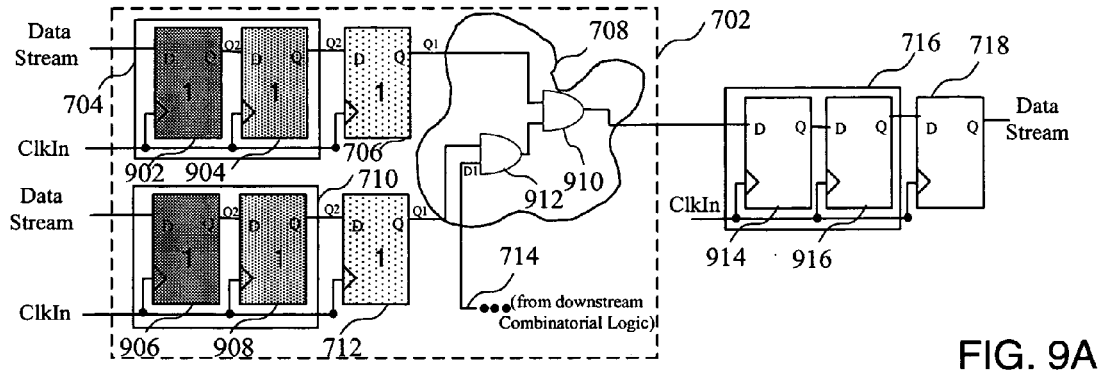
FIG. 9 is a sequence of block diagrams showing the transfer of data according to an embodiment of the present invention.
Figure 9B:
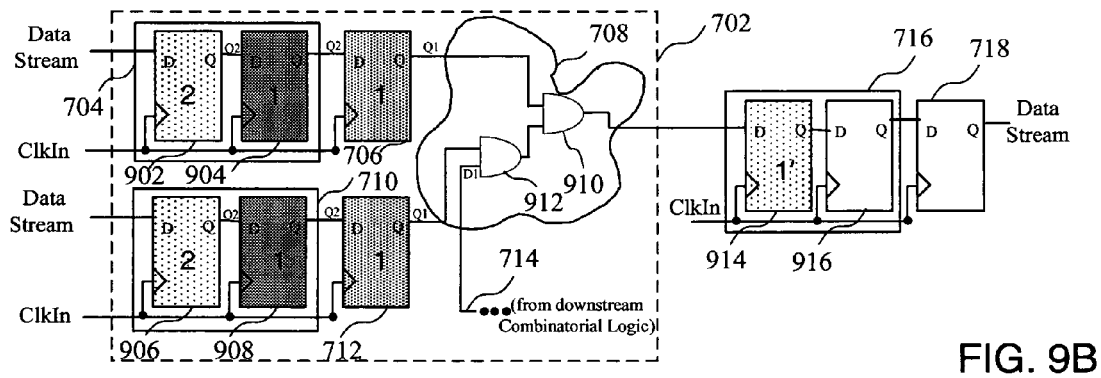
Figure 9C:
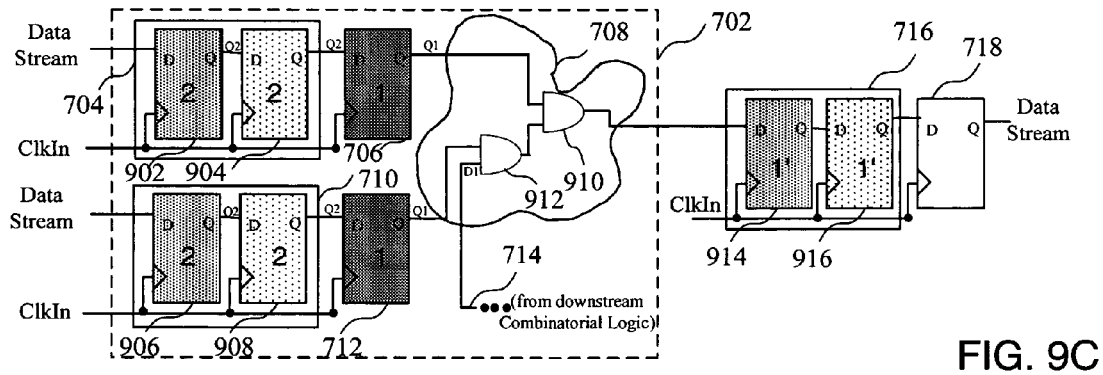
Figure 9D:
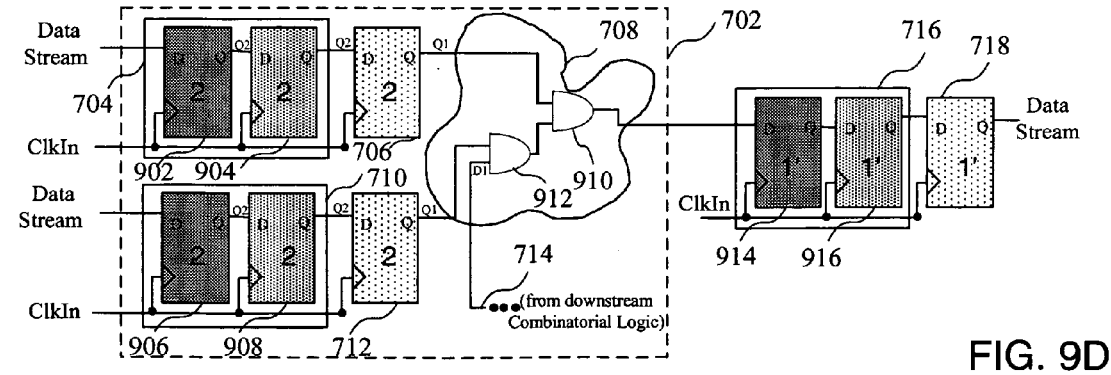

A sequence of 4 cycles is shown in FIGS. 9A-9D so that a word from each data stream is output by the logic circuit 702. As shown in FIG. 9A, the data associated with the first data stream is stored in register 706, while data for the second and third data streams is stored in registers 904 and 902, respectively, of shift register 704. Data of the data stream is similarly shifted through the second data path comprising register 710 and flip flop 712. Accordingly, data shifted into and out of combinatorial logic 708 will be discussed in reference to the elements of the first path. As shown in FIG. 9B, the data word 1 associated with the first data stream is shifted out to the next stage and stored in register 914 as data word 1'. Data word 1 of the second and third data streams stored in registers 904 and 902, respectively, are shifted to registers 706 and 904 respectively. As can also be seen in FIG. 9B, a new input data word 2 of the first data stream is stored in register 902. As shown in FIG. 9C, the data word 1 associated with the second data stream is shifted out to the next stage and stored in register 914 as data word 1'. Data word 1 of the third and data word 2 of the first data streams stored in registers 904 and 902, respectively, are shifted to registers 706 and 904 respectively. Also, data word 2 associated with the second data stream is now stored in register 902. Finally, as shown in FIG. 9D, the data word 1 associated with the third data stream and modified by the combinatorial logic is shifted out to the next stage and stored in register 914 as data word 1'. Data word 2 of the first and second data streams stored in registers 904 and 902, respectively, are shifted to registers 706 and 904 respectively. Data word 2 associated with the third data stream is now stored in register 902 of the shift register 704. The number of registers of the various logic blocks 702 in the data control circuit are preferably always the same. When the data stream comprising data words is output by the final logic block, it is demultiplexed by demultiplexer 504 and provided to the appropriate data channels 506. The data is then output on the appropriate data channels at the second clock rate using Clk-Out.

Figure 10:
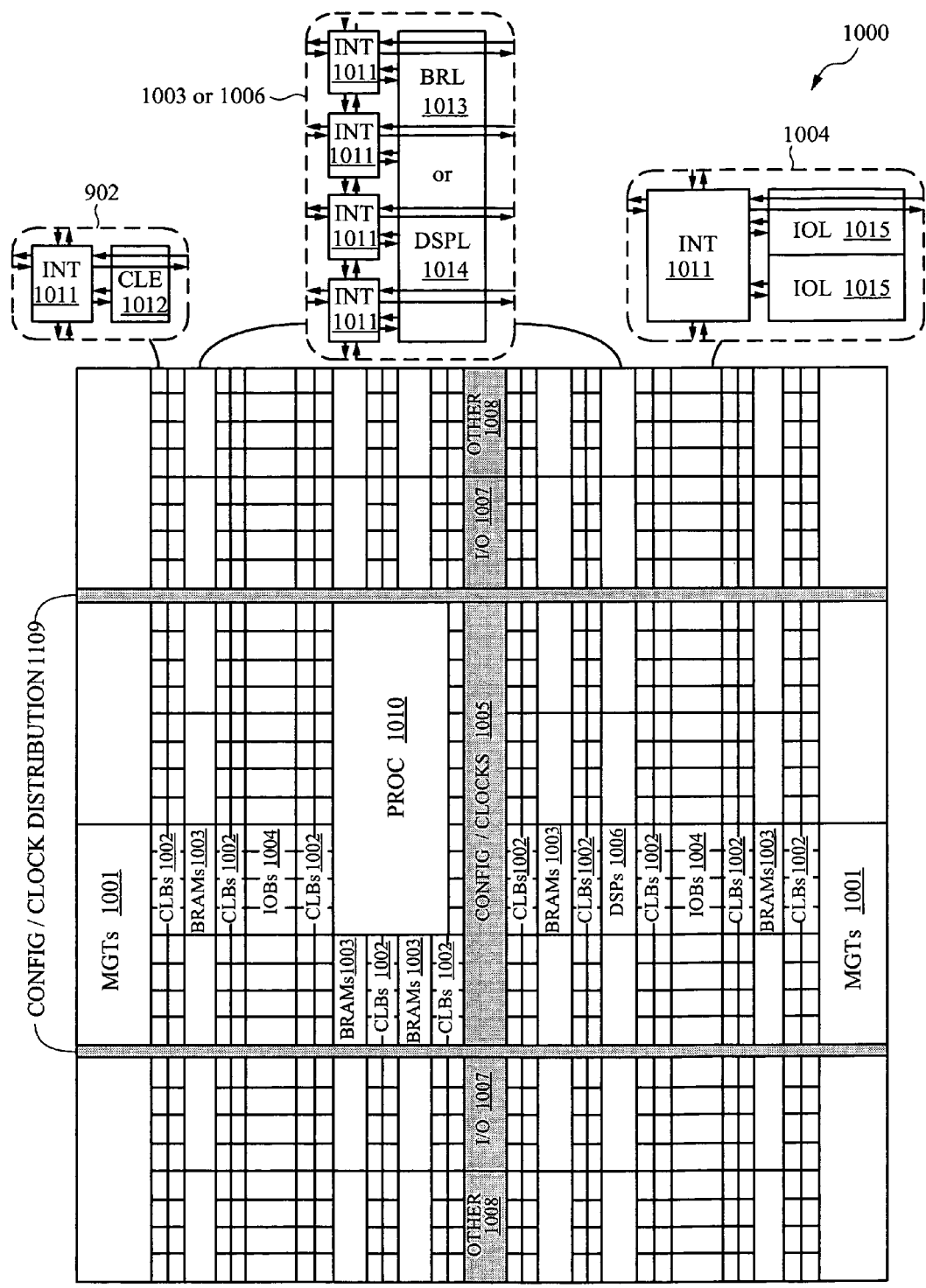
FIG. 10 is a block diagram of a programmable logic device for implementing the circuits and methods according to embodiments the present invention.

Turning now to FIG. 10, a block diagram of a programmable logic device for implementing circuits or methods according to embodiments the present invention is shown. In particular, the circuit of FIGS. 3-9 could be implemented in the programmable logic device of FIG. 10. Advanced FPGAs can include several different types of programmable logic blocks in the array. For example, FIG. 10 illustrates an FPGA architecture 1000 that includes a large number of different programmable tiles including multi-gigabit transceivers (MGTs 1001), configurable logic blocks (CLBs 1002), random access memory blocks (BRAMs 1003), input/output blocks (IOBs 1004), configuration and clocking logic (CONFIG/CLOCKS 1005), digital signal processing blocks (DSPs 1006), specialized input/output blocks (I/O 1007) (e.g., configuration ports and clock ports), and other programmable logic 1008 such as digital clock managers, analog-to-digital converters, system monitoring logic, and so forth. Some FPGAs also include dedicated processor blocks (PROC 1010). The data control circuit 502 could be implemented in configurable logic blocks of the circuit of FIG. 10. While the data transceivers are shown as a part of the programmable logic device of FIG. 10, the data transceivers could be implemented separate from the programmable logic device.

In some FPGAs, each programmable tile includes a programmable interconnect element (INT 1011) having standardized connections to and from a corresponding interconnect element in each adjacent tile. Therefore, the programmable interconnect elements taken together implement the programmable interconnect structure for the illustrated FPGA. The programmable interconnect element (INT 1011) also includes the connections to and from the programmable logic element within the same tile, as shown by the examples included at the top of FIG. 10.

For example, a CLB 1002 can include a configurable logic element (CLE 1012) that can be programmed to implement user logic plus a single programmable interconnect element (INT 1011). A BRAM 1003 can include a BRAM logic element (BRL 1013) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 1106 can include a DSP logic element (DSPL 1014) in addition to an appropriate number of programmable interconnect elements. An IOB 1004 can include, for example, two instances of an input/output logic element (IOL 1015) in addition to one instance of the programmable interconnect element (INT 1011). As will be clear to those of skill in the art, the actual I/O pads connected, for example, to the I/O logic element 1015 are manufactured using metal layered above the various illustrated logic blocks, and typically are not confined to the area of the input/output logic element 1015.

In the pictured embodiment, a columnar area near the center of the die (shown shaded in FIG. 10) is used for configuration, clock, and other control logic. Horizontal areas 1009 extending from this column are used to distribute the clocks and configuration signals across the breadth of the FPGA. Some FPGAs utilizing the architecture illustrated in FIG. 10 include additional logic blocks that disrupt the regular columnar structure making up a large part of the FPGA. The additional logic blocks can be programmable blocks and/or dedicated logic. For example, the processor block PROC 1010 shown in FIG. 10 spans several columns of CLBs and BRAMs.

Note that FIG. 10 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 10 are purely exemplary. For example, in an actual FPGA more than one adjacent column of CLBs is typically included wherever the CLBs appear, to facilitate the efficient implementation of user logic. Similarly the circuits and methods of the present invention could be implemented in any device, including any type of programmable logic device, having memory.

Figure 11:
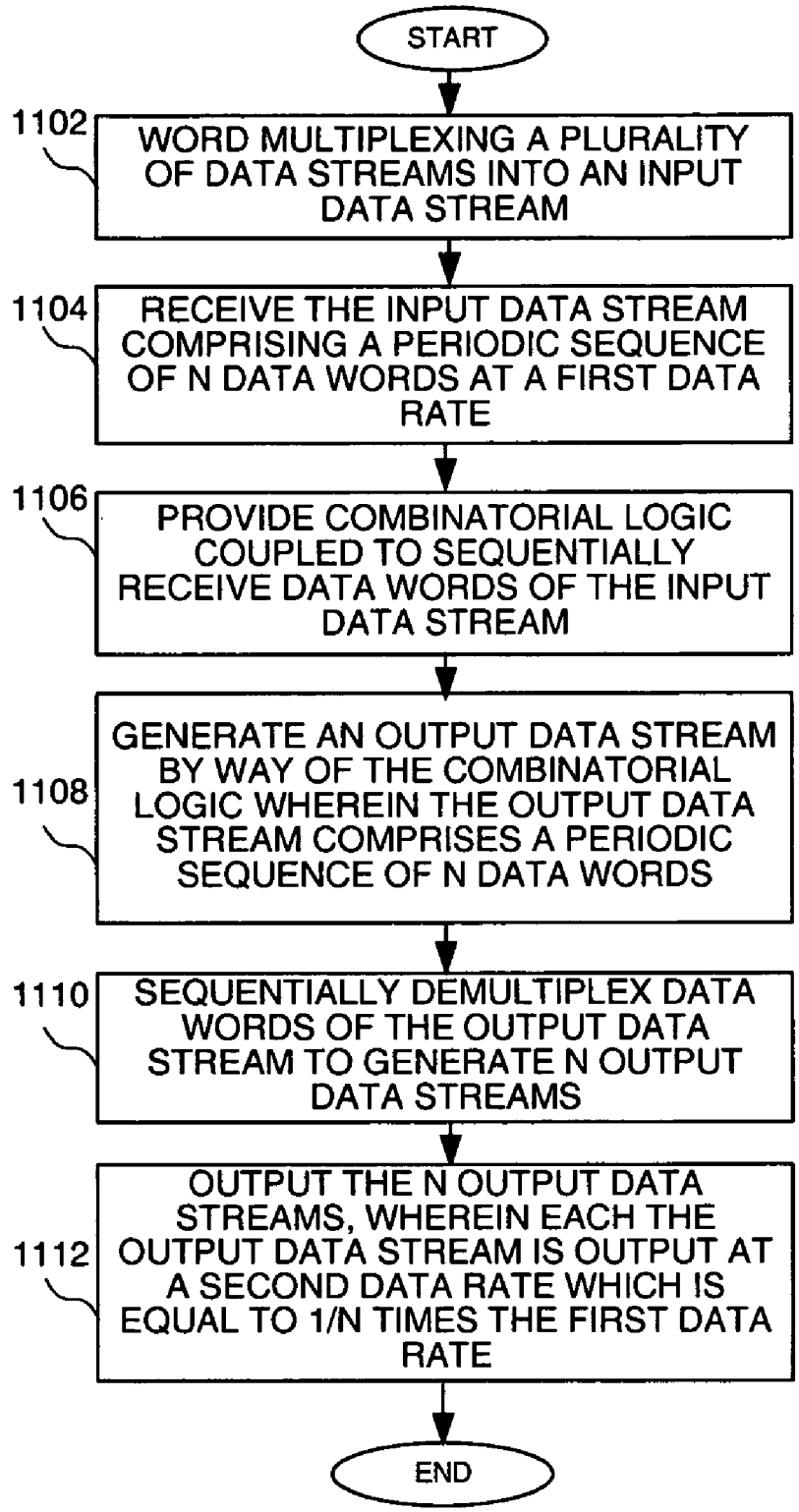
FIG. 11 is a flow chart showing a method of generating a plurality of data streams according to an embodiment of the present invention.

Turning now to FIG. 11, a flow chart shows a method of generating a plurality of data streams according to an embodiment of the present invention. A plurality of data streams is word multiplexed to generate an input data stream at a step 1102. The input data stream comprising a periodic sequence of N data words is received at a first data rate at a step 1104. Combinatorial logic coupled to sequentially receive data words of the input data stream is provided at a step 1106. That is, a signal combinatorial logic circuit processes data for a plurality of data streams. An output data stream is generated by way of the combinatorial logic wherein the output data stream comprises a periodic sequence of N data words at a step 1108. Data words of the output data stream are then sequentially demultiplexed to generate N output data streams at a step 1110. The N output data streams are output at a step 1112, wherein each the output data stream is output at a second data rate which is equal to 1/N times the first data rate. The method of FIG. 11 could be implemented using any of the circuits of FIGS. 3-10, or some other suitable circuits.

It can therefore be appreciated that the new and novel method of and circuit for generating a plurality of data stream has been described. Although reference is made in this application to specific integrated circuits such as programmable logic devices, the methods and circuits could be employed in any type of integrated circuit, whether programmable or fixed logic. However, programmable logic devices provide additional flexibility in implementing the circuits, as described above. Also, while specific examples are given for data transmission protocols, such as a 1-Gigabit Ethernet MAC core, the methods and circuits could apply to any protocol, including Tri-Mode Ethernet MAC core or a Fibre Channel. Although the various circuits could be employed on a single integrated circuit comprising programmable logic for implementing the circuits of the present invention and one or more data transceivers, they could also be employed on separate integrated circuits. For example, the circuits set forth above could be implemented by using a data transceiver coupled to a programmable logic chip. It will be appreciated by those skilled in the art that numerous alternatives and equivalents will be seen to exist which incorporate the disclosed invention. As a result, the invention is not to be limited by the foregoing embodiments, but only by the following claims.

The invention claimed is:

1. A method of generating a plurality of output data streams using a data protocol, said method comprising the steps of:
   receiving a plurality of data streams comprising frames of data to be processed by a data transceiver at a plurality of channels, each frame of a data stream of said plurality of data streams having a plurality of words;
   transforming said plurality of data streams to generate a single input data stream comprising a periodic sequence of data words, wherein said periodic sequence of data words comprises a predetermined sequence of consecutive data words having a data word of each data stream of said plurality of data streams;
   coupling said single input data stream to an input of a data control circuit of said data transceiver using a queuing element for storing words of said single input data stream, wherein said data control circuit comprises a combinatorial resource for implementing said data protocol;
   sequentially processing said data words of said single input data stream by said data control circuit, wherein said data control circuit implements said data protocol for each word of said single input data stream generated at an output of said queuing element and stores data processed by said data control circuit in a plurality of registers coupled in series and corresponding to said plurality of data streams;

generating an output data stream at an output of said data control circuit; and demultiplexing data of said output data stream generated by said data control circuit to generate said plurality of output data streams at an output of said data transceiver according to said data protocol.

2. The method of claim 1 further comprising a step of outputting a plurality of N output data streams at a data rate which is equal to 1/N times a data rate for coupling said single input data stream to said input of said data control circuit.

3. The method of claim 2 wherein coupling said single input data stream using a queuing element comprises a step of shifting N data words of said single input data stream through a shift register.

4. The method of claim 3 wherein said step of shifting N data words of said single input data stream comprises a step of providing said shift register having a delay of N−1 clock cycles.

5. The method of claim 4 wherein said step of sequentially processing said data words of said single input data stream by a data control circuit comprises a step of implementing logic in a configurable logic block of a programmable logic device.

6. The method of claim 5 wherein said step of implementing said logic in a configurable logic block of a programmable logic device comprises a step of implementing a data transfer protocol using said logic in said configurable logic block separately to generate each of said plurality of output data streams.

7. A circuit for generating a plurality of output data streams using a data protocol, said circuit comprising:

a parallel-to-serial conversion circuit coupled to receive a plurality of data streams comprising frames of data to be processed by a data transceiver and generate a single input data stream comprising a periodic sequence of data words, wherein said periodic sequence comprises a predetermined sequence of consecutive data words having a data word of each data stream of said plurality of data streams;

an input of a queuing element coupled to receive said single input data stream comprising said periodic sequence of data words, wherein each of said data word of said single input data stream is associated with a data stream of a plurality of data streams;

a data control circuit of said data transceiver coupled to an output of said queuing element, said data control circuit comprising a common control circuit for sequentially implementing said data protocol for each of said data streams of said plurality of data streams and a plurality of registers coupled in series and corresponding to said plurality of data streams for storing data processed while implementing said data protocol; and a demultiplexer coupled to said data control circuit, said demultiplexer outputting said plurality of output data streams at an output of said data transceiver according to said data protocol.

8. The circuit of claim 7 further comprising a register at an output of said queuing element, wherein said queuing element comprises a shift register set to shift N−1 data words.

9. The circuit of claim 8 further comprising a plurality of medium independent interfaces at an output of said demultiplexer, wherein each said medium independent interface generates one of N data streams output by said demultiplexer at a data rate of 1/N times a data rate of said single input data stream.

10. The circuit of claim 7 wherein said data control circuit comprises a circuit for implementing a data link layer according to a data communication protocol.

11. The circuit of claim 7 further comprising a plurality of logic circuits coupled in series, wherein each logic circuit comprises a shift register and combinatorial logic.

12. The circuit of claim 11 wherein each said logic circuit of said plurality of logic circuits is configured in a configurable logic block of a programmable logic device.

13. The circuit of claim 7 wherein said circuit comprises a programmable logic device having said data transceiver, wherein said data control circuit controls said data transceiver to generate said plurality of output data streams based upon said plurality of data streams.

14. A circuit for generating a plurality of output data streams using a data protocol, said circuit comprising:

an input coupled to receive a single input data stream comprising a plurality of data words at a first data rate, wherein each of said data word of said single input data stream is associated with a frame of data of a plurality of data streams to be processed by a data transceiver and said single input data stream is arranged in a periodic sequence of data words, wherein said periodic sequence comprises a predetermined sequence of consecutive data words having a data word of each data stream of said plurality of data streams;

a configurable circuit associated with said data transceiver comprising:

a shift register coupled to said input, said shift register configured to shift said plurality of data words; and a combinatorial resource coupled to said shift register to receive data words of said plurality of data streams, wherein said combinatorial resource sequentially implements a data protocol for each data stream of said plurality of data streams, couples data processed while implementing said data protocol to a plurality of registers coupled in series and corresponding to said plurality of data streams, and generates an output data stream comprising data words associated with each data stream of said plurality of data streams; and a demultiplexer coupled to receive said output data stream from said combinatorial resource and output said plurality of output data streams at an output of said data transceiver according to said data protocol at a second data rate.

15. The circuit of claim 14 wherein said circuit comprises a plurality of said configurable circuits coupled in series, wherein said plurality of registers is coupled between a first configurable circuit and a second configurable circuit of said combinatorial resource.

16. The circuit of claim 14 wherein said demultiplexer outputs data for each of N output data streams at said second data rate which is a multiple of 1/N times said first data rate.

17. The circuit of claim 16 further comprising a plurality of medium independent interfaces coupled to outputs of said demultiplexer.

18. The circuit of claim 14 wherein said circuit comprises a data link layer of a LAN system.

19. The circuit of claim 14 wherein said circuit comprises a Medium Access Control (MAC) interface of an Ethernet LAN system.

20. The circuit of claim 14 wherein said circuit comprises a Field Programmable Gate Array having a data transceiver.

* * * * *